(12) United States Patent
Alsewdan et al.

(10) Patent No.: US 11,247,196 B2
(45) Date of Patent: Feb. 15, 2022

(54) ZEOLITE WITH ENCAPSULATED PLATINUM

(71) Applicant: Saudi Arabian Oil Company, Dhahran (SA)

(72) Inventors: Donya Alsewdan, Dhahran (SA); Lianhui Ding, Dhahran (SA); Manal Al-Eid, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 62 days.

(21) Appl. No.: 16/703,405

(22) Filed: Dec. 4, 2019

(65) Prior Publication Data
US 2021/0170374 A1 Jun. 10, 2021

(51) Int. Cl.
| | |
|---|---|
| *B01J 29/40* | (2006.01) |
| *B01J 29/44* | (2006.01) |
| *B01J 35/10* | (2006.01) |
| *B01J 37/00* | (2006.01) |
| *B01J 37/02* | (2006.01) |
| *B01J 37/03* | (2006.01) |
| *B01J 37/04* | (2006.01) |
| *B01J 37/06* | (2006.01) |
| *B01J 37/08* | (2006.01) |
| *B01J 37/30* | (2006.01) |
| *B01J 29/064* | (2006.01) |
| *B01J 37/10* | (2006.01) |
| *B01J 29/06* | (2006.01) |
| *B01J 29/42* | (2006.01) |
| *B01J 29/068* | (2006.01) |
| *C01B 39/36* | (2006.01) |
| *C01B 39/02* | (2006.01) |
| *C01B 39/40* | (2006.01) |
| *C01B 39/04* | (2006.01) |

(52) U.S. Cl.
CPC ............ *B01J 29/44* (2013.01); *B01J 29/061* (2013.01); *B01J 29/064* (2013.01); *B01J 29/068* (2013.01); *B01J 29/42* (2013.01); *B01J 35/1019* (2013.01); *B01J 35/1038* (2013.01); *B01J 37/009* (2013.01); *B01J 37/0018* (2013.01); *B01J 37/0236* (2013.01); *B01J 37/031* (2013.01); *B01J 37/04* (2013.01); *B01J 37/06* (2013.01); *B01J 37/08* (2013.01); *B01J 37/10* (2013.01); *B01J 37/30* (2013.01); *C01B 39/02* (2013.01); *C01B 39/04* (2013.01); *C01B 39/36* (2013.01); *C01B 39/365* (2013.01); *C01B 39/40* (2013.01); *B01J 2229/186* (2013.01); *B01J 2229/38* (2013.01)

(58) Field of Classification Search
CPC ...... B01J 29/061; B01J 29/064; B01J 29/068; B01J 29/42; B01J 29/44; B01J 2229/38; B01J 2229/186; B01J 35/1019; B01J 35/1038; B01J 37/0018; B01J 37/10; B01J 37/009; B01J 37/0236; B01J 37/031; B01J 37/04; B01J 37/06; B01J 37/08; B01J 37/30; C01B 39/02; C01B 39/04; C01B 39/36; C01B 39/365; C01B 39/40
USPC ...... 502/60, 64, 66, 69, 71, 74, 77; 423/700, 423/701, 702, 704
See application file for complete search history.

(56) References Cited

U.S. PATENT DOCUMENTS

| | | |
|---|---|---|
| 4,180,689 A | 12/1979 | Davies et al. |
| 4,740,292 A | 4/1988 | Chen et al. |
| 5,939,362 A | 8/1999 | Johnson et al. |
| 6,232,273 B1 | 5/2001 | Namba et al. |
| 8,951,498 B2 | 2/2015 | Larsen et al. |
| 9,145,465 B2 | 9/2015 | Spencer et al. |
| 9,493,598 B2 | 11/2016 | Musa et al. |
| 2009/0023968 A1 | 1/2009 | Wang et al. |
| 2011/0277844 A1 | 11/2011 | Musa et al. |
| 2012/0025882 A1 | 2/2012 | Shanan |
| 2013/0123147 A1 | 5/2013 | Musa et al. |
| 2015/0322330 A1 | 11/2015 | Spencer et al. |

(Continued)

FOREIGN PATENT DOCUMENTS

| | | |
|---|---|---|
| AU | 465697 | 10/1972 |
| AU | 2014413311 | 7/2017 |

(Continued)

OTHER PUBLICATIONS

Akhtar et al, "Aromatization of alkanes over Pt promoted conventional and mesoporous gallosilicates of MEL zeolite," Catalysis Today vol. 179, Issue 1, Jan. 2012, pp. 61-72, 12 pages.

(Continued)

*Primary Examiner* — Elizabeth D Wood
(74) *Attorney, Agent, or Firm* — Fish & Richardson P.C.

(57) ABSTRACT

A method of making a zeolite with encapsulated platinum is provided. The method includes dissolving an aluminum source in water to form a first solution, dissolving a hydroxide in water to form a second solution, dissolving a templating agent in water to form a third solution, and adding a silica source to the first solution to form a fourth solution. The method further includes adding the second solution to the fourth solution to form a fifth solution, adding the third solution to the fifth solution to form a sixth solution, and adding a platinum source to the sixth solution. The sixth solution is crystallized to form a solid product, which is recovered. The solid product is calcined. An ammonium ion exchange is performed on the solid product to form a second solid product, and the second solid product is calcined.

20 Claims, 4 Drawing Sheets

(56) References Cited

U.S. PATENT DOCUMENTS

| | | | |
|---|---|---|---|
| 2016/0023913 A1* | 1/2016 | Goel | C01B 39/026 |
| | | | 423/709 |
| 2016/0051971 A1* | 2/2016 | Choi | C10G 45/64 |
| | | | 502/74 |
| 2016/0137516 A1* | 5/2016 | Kegnæs | B01J 37/0018 |
| | | | 585/467 |
| 2017/0321108 A1 | 11/2017 | Majnouni et al. | |
| 2017/0341063 A1 | 11/2017 | Otto et al. | |
| 2018/0311651 A1* | 11/2018 | Ravon | B01J 37/0201 |
| 2019/0083963 A1* | 3/2019 | Choi | B01J 37/0201 |
| 2019/0168197 A1 | 6/2019 | Corma Canos et al. | |

FOREIGN PATENT DOCUMENTS

| | | |
|---|---|---|
| CN | 106430235 | 2/2017 |
| EP | 0186447 | 1/1991 |
| EP | 2449153 | 1/2019 |
| WO | WO 1993025798 | 12/1993 |
| WO | WO 1998051902 | 11/1998 |
| WO | WO 2017202495 | 11/2017 |

OTHER PUBLICATIONS

Bhattacharya et al, "Aromatization of n-hexane over H-ZSM-5: Influence of promoters and added gases," Applied Catalysis A: General, vol. 141, issues 1-2, Jul. 1996, pp. 105-115, 11 pages.

Bibby et al, "NH4+-tetraalkyl ammonium systems in the synthesis of zeolites," Nature, 285(5759), pp. 30-31, May 1980, 2 pages.

Camblor et al, "Characterization of nanocrystalline zeolite Beta," Microporous and Mesoporous Materials, vol. 25, Issues 1-3, Dec. 1998, pp. 59-74, 16 pages.

Camblor et al, "Synthesis of nanocrystalline zeolite beta in the absence of alkali metal cations," Studies in Surface Science and Catalysis vol. 105, 1997, pp. 341-348.

Ding et al, "Effect of agitation on the synthesis of zeolite beta and its synthesis mechanism in absence of alkali cations," Microporous and Mesoporous Materials, vol. 94, Issues 1-3, Sep. 2006, pp. 1-8.

Dyballa et al, "Parameters influencing the selectivity to propene in the MTO conversion on 10-ring zeolites: directly synthesized zeolites ZSM-5, ZSM-11, and ZSM-22," Applied Catalysis A: General, vol. 510, Jan. 2016, pp. 233-243, 41 pages.

Farrusseng et al, "Zeolite-Encapsulated Catalysts: Challenges and Prospects," Encapsulated Catalysts, Chapter 11, 2017, pp. 335-386, 52 pages.

Garcia-Martinez et al, "A mesostructured Y zeolite as a superior FCC catalyst—from lab to refinery," Chem. Commun., vol. 48, issue 97, pp. 11841-11843, Aug. 2012, 3 pages.

Ghamami et al, "Synthesis and crystal growth of zeolite (NH4, TPA)-ZSM-5," Zeolites, vol. 3, issue 2, Apr. 1983, pp. 155-162, 8 pages.

Hou et al, "Nucleation and Growth of NH4-ZSM-5 Zeolites," Studies in Surface Science and Catalysis,vol. 28, 1986, pp. 239-246, 8 pages.

Kalita et al, "Studies on stability of nanocrystalline MFI zeolite synthesized by a novel method against OH-attack," Materials Chemistry and Physics, vol. 129, issue 1-2, Sep. 2011, pp. 371-379, 9 pages.

Kim et al, "Oligomerization and isomerization of dicyclopentadiene over mesoporous materials produced from zeolite beta," Catalysis Today, 232, Sep. 2014, pp. 69-74, 6 pages.

Landau et al, "Colloidal Nanocrystals of Zeolite β Stabilized in Alumina Matrix," Chem. Mater., Apr. 1999, 11, 8, pp. 2030-2037, 8 pages.

Li et al, "Realizing the Commercial Potential of Hierarchical Zeolites: New Opportunities in Catalytic Cracking" Chem Cat Chem Review, 6, 10, pp. 46-66, Sep. 2013, 22 pages.

Liu et al, "Synthesis, characterization, and catalytic performance of hierarchical ZSM-11 zeolite synthesized via dual-template route," Chinese Journal of Catalysis, vol. 39, Issue 1, Jan. 2018, pp. 167-180, 14 pages.

Ma et al, "A review of zeolite-like porous materials," Microporous and Mesoporous Materials, vol. 37, Issues 1-2, May 2000, pp. 243-252, 10 pages.

Manimaran et al, "Corrosion Inhibition of carbon steel by polyacrylamide," Research Journal of Chemical Sciences, vol. 2(3), pp. 52-57, Mar. 2012, 6 pages.

Meng et al, "Templating route for synthesizing mesoporous zeolites with improved catalytic properties," Nano Today 4(4), pp. 292-301, Jun. 2009, 10 pages.

Micromeritics [online], "AutoChem II 2920: The Catalyst Characterization Laboratory," AutoChem II brochure, accessed Sep. 30, 2019, URL: <https://www.micromeritics.com/Repository/Files/autochem2920-brochure-2017.pdf> 2007, 5 pages.

Prokesova et al, "Preparation of nanosized micro/mesoporous composites via simultaneous synthesis of Beta/MCM-48 phases," Microporous and Mesoporous Materials vol. 64, Issues 1-3, Oct. 2003, pp. 165-174, 10 pages.

Qin et al, "Mesoporous Y zeolite with homogeneous aluminum distribution obtained by sequential desilication-dealumination and its performance in the catalytic cracking of cumene and 1,3,5-triisopropylbenzene," Journal of Catalysis, vol. 278, Feb. 2011, pp. 266-275, 10 pages.

Van Grieken et al, "Anomalous crystallization mechanism in the synthesis of nanocrystalline ZSM-5," Microporous Mesoporous Materials, vol. 39, issues 1-2, Sep. 2000, pp. 135-147, 13 pages.

Viswanadham et al, "Reaction pathways for the aromatization of paraffins in the presence of H-ZSM-5 and Zn/H-ZSM-5," Applied Catalysis A: General vol. 137, Issue 2, Apr. 1996, pp. 225-233, 9 pages.

Webb, "Introduction to Chemical Adsorption Analytical Techniques and their Applications to Catalysis," MIC Technical Publications, Micromeritics, Jan. 2003, 12 pages.

Xue et al, "Facile synthesis of nano-sized NH4-ZSM-5 zeolites," Microporous and Mesoporous Materials, vol. 156, Jul. 2012, pp. 29-35, 7 pages.

Yang et al, "Incorporating platinum precursors into a NaA-zeolite synthesis mixture promoting the formation of nanosized zeolite," Microporous and Mesoporous Materials, 117(1-2), Jan. 2009, pp. 33-40, 8 pages.

Zhang et al, "Differences between ZSM-5 and ZSM-11 zeolite catalysts in 1-hexene aromatization and isomerization," Fuel Processing Technology vol. 91, Issue 5, May 2010, pp. 449-455, 7 pages.

Zhang et al, "Innovations in hierarchical zeolite synthesis," Catalysis Today, vol. 264, Apr. 2016, pp. 3-15, 13 pages.

PCT International Search Report and Written Opinion in International Appln. No. PCT/US2020/062881, dated Feb. 25, 2021, 15 pages.

Liu et al., "Regioselective generation and reactivity control of subnanometric platinum clusters in zeolites for high-temperature catalysis," Nature Materials, Nature Pub. Group, London, Jul. 2019, 18(8): 866-873, 10 pages.

* cited by examiner

ZEOLITE WITH ENCAPSULATED PLATINUM

BACKGROUND

Catalytic reforming is a mature industrial technology in the petrochemical field, mainly used for the production of alkenes, high octane gasoline and hydrogen. During the reforming process, feedstocks, such as low-octane straight chain alkanes (paraffins), are reformed into branched alkanes (isoparaffins) and cyclic naphthenes. These molecules are then partially dehydrogenated to produce high-octane aromatic hydrocarbons such as benzene, toluene and xylenes (BTX).

Bifunctional catalysts consisting of both metal and acid functions are mostly used in this process. Among these type of catalysts, medium pore size ZSM-5 represents the most commonly used zeolite. However, the efficiency and selectivity of ZSM-5 in this process may be limited by the diffusion of reagents into the zeolite network Another zeolite, ZSM-11 has attracted a significant amount of attention for use as a solid acid catalyst in the aromatization process. ZSM-11 has a high surface area, a high hydrothermal stability, high acidity, a distinctive structure, and shape selectivity.

To form the bifunctional catalysts, metals are generally introduced into zeolites by impregnation methods, in which the formed zeolite catalyst is treated with a metal precursor to form active metal sites. However, using these methods, most metals are distributed on the outside surface of the zeolite, especially in the case of zeolites having small pores, such as ZSM-11. Current research in catalytic reforming is primarily focused on improving the catalysts to improve conversion rates for forming naphthenes and isoparaffins to maximum BTX products.

SUMMARY

An embodiment described herein provides a method of making a zeolite with encapsulated platinum. The method includes dissolving an aluminum source in water to form a first solution, dissolving a hydroxide in water to form a second solution, dissolving a templating agent in water to form a third solution, and adding a silica source to the first solution to form a fourth solution. The method further includes adding the second solution to the fourth solution to form a fifth solution, adding the third solution to the fifth solution to form a sixth solution, and adding a platinum source to the sixth solution. The sixth solution is crystallized to form a solid product, which is recovered. The solid product is calcined. An ammonium ion exchange is performed on the solid product to form a second solid product, and the second solid product is calcined.

DETAILED DESCRIPTION

The encapsulation of metal into the zeolite during synthesis modifies the local geometry around the active sites and, therefore, enhances the catalytic activity and the selectivity towards the formation of aromatics. Embodiments described herein provide a synthesis technique to encapsulate platinum into ZSM-11 zeolite by the direct hydrothermal synthesis of the ZSM-11 in the presence of platinum precursors. These techniques enhance the distribution of the platinum, creating more reactive sites. As a result, the catalytic activity and the selectivity of light hydrocarbon aromatization is enhanced. Compared with conventional impregnated Pt/ZSM-11 catalysts, the conversion and BTX selectivity increased by 10% and 23% respectively for Pt encapsulated ZSM-11 prepared by this invention.

Figure 1:
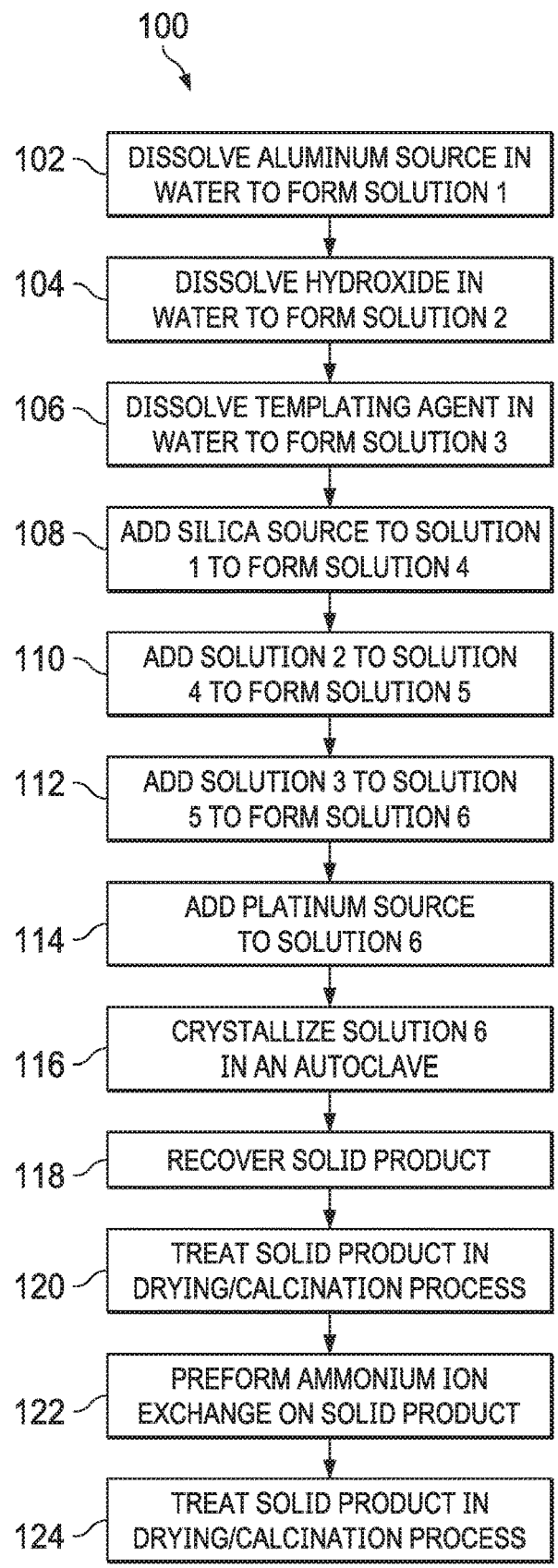
FIG. 1 is a process flow diagram of a method for forming a zeolite with encapsulated platinum.

FIG. 1 is a process flow diagram of a method 100 for forming a zeolite with encapsulated platinum. The method 100 begins at block 102, when an aluminum source is dissolved in water to form a first solution (Al sol). The aluminum source may be aluminum nitrate, aluminum sulfate, or aluminum chloride, among others. In an embodiment, the aluminum source is aluminum nitrate nonahydrate.

At block 104, a hydroxide is dissolved water to form a second solution (OH sol). The hydroxide may be lithium hydroxide, sodium hydroxide, or potassium hydroxide. In an embodiment, the hydroxide is sodium hydroxide.

At block 106, a templating agent is dissolved in water to form a third solution (TA sol). For the formation of ZSM-11, the templating agent used is tetrabutyl ammonium hydroxide. However, the techniques described herein are not limited to ZSM-11, but may be used to form other zeolites with platinum encapsulation. For example, tetrapropyl ammonium hydroxide may be used as a templating agent to form ZSM-5 in the present techniques.

At block 108, a silica source is added to the first solution (Al sol) to form a fourth solution (Al Si sol). In an embodiment, the silica source is tetraethylorthosilicate. In other embodiments, the silica source is tetramethylorthosilicate.

At block 110, the second solution (OH sol) is added to the fourth solution (Al Si sol) to form a fifth solution (Sol Gel). In various embodiments, the addition is generally performed dropwise, for example, allowing each droplet of the second solution to mix with the fourth solution.

At block 112, the third solution (TA Sol) is added to the fifth solution (Sol Gel) to form a sixth solution (Precursor). The addition is performed while vigorously stirring the fifth solution, for example, using a magnetic stir bar on a stirring plate set to high, using a motorized lab stirrer driving an agitator in the solution, or using a sonicator.

At block 114, a platinum sources added to the sixth solution (Precursor). In an embodiment, the platinum source is $Pt(NH_3)_4Cl_2 \cdot H_2O$. In other embodiments, the platinum source is $K_2PtCl_4$, cis-$PtCl_2(P(C_6H_5)_3)_2$, $(NH_4)_2PtCl_4$, or cis-$PtCl_2(NH_3)_2$, among others.

At block 116, the sixth solution (Precursor), with the added platinum, is treated in an autoclave to force crystallization. In some embodiments, the crystallization is carried out under agitation, for example, using an autoclave that is rotated in an oven. In an embodiment, the autoclave is lined with a PTFE polymer. In another embodiment, the autoclave is formed from a ceramic. In embodiments, the crystallization time is between about 3 to about 7 days, or between about 4 to about 6 days, or about 5 days. The temperature of the crystallization is between about 140° C. and about 200° C., between about 160° C. and 180° C., or about 170° C.

At block 118, the resulting solid product from the crystallization is recovered. In some embodiments, the resulting solid phase is recovered by filtration, for example, in a vacuum filtration system. In other embodiments, the resulting solid product is recovered by high-speed centrifugation.

The resulting solid product is rinsed with distilled water, for example, by flowing multiple aliquots of distilled water through the solid product in the vacuum filtration apparatus.

At block 120, the solid product is dried, for example, at between about 90° C. and about 120° C. for about 12 hours to about 16 hours. The dried solid product is then calcined. The calcination may be performed at a temperature of between about 400° C. and about 700° C., or at a temperature of between about 500° C. and about 600° C. The calcination may be performed for about 4 hours, about 8 hours, about 12 hours, or about 16 hours. In an embodiment, the calcination is carried out by ramping the temperature from the drying temperature to about 550° C. at about 1° C./min, then holding the temperature at 550° C. for about 8 hours. After calcination, the solid product is Pt/NaZSM-11.

At block 122, the solid product, Pt/NaZSM-11, is ion exchanged with a source of ammonium ions, such as an ammonium chloride solution. In various embodiments, the ion exchange is performed by immersing the solid product in an ammonium solution. For example, immersing the solid product in an ammonium nitrate solution at a concentration of between about 0.5 M and about 2.0 M, at a temperature of between about 80° C. and about 100° C., and for about 1 hour to about 2 hours. In other embodiments, the ion exchange is performed at a temperature of between about 60° C. and about 120° C., at a temperature of between about 80° C. and about 100° C., or at a temperature of 90° C. In some embodiments, the source of ammonium ions is an aqueous solution of ammonium chloride. The ion exchange is repeated for a total of two cycles.

At block 124, after the ion exchange with ammonium ions, the resulting solid product is dried and calcined. In some embodiments, this is performed using the same conditions as described with respect to block 120. After calcination, the solid product is PtHZSM-11.

EXAMPLES

Materials

Aluminum nitrate nonahydrate was obtained from Sigma Aldrich. Sodium hydroxide was obtained from Sigma Aldrich. Tetrabutyl ammonium hydroxide was obtained from Sigma Aldrich. Tetraethylorthosilicate was obtained from Sigma Aldrich. $Pt(NH_3)_4Cl_2 \cdot H_2O$ was obtained from Sigma Aldrich.

Synthesis of PtHZSM-11 Zeolite

A PtHZSM-11 zeolite was synthesized in the following steps. 2.62 g of aluminum nitrate nonahydrate was dissolved in 16 g of purified water to form a first solution. 0.51 g of sodium hydroxide was dissolved in 21.4 g of purified water to form a second solution. 31.45 g of tetrabutyl ammonium hydroxide was dissolved in 34 g of purified water to form a third solution. 51 g of tetraethyl orthosilicate was dropwise to the first solution to form a fourth solution. All of the second solution was added dropwise to the fourth solution to form a fifth solution. While the fifth solution was vigorously stirred, using a magnetic stirrer, the third solution was added to form a sixth solution.

While stirring the sixth solution, 0.13 g of $Pt(NH_3)_4Cl_2 \cdot H_2O$ was added. The solution was stirred for about 30 min., although the $Pt(NH_3)_4Cl_2 \cdot H_2O$ was dissolved after about 10 min.

Crystallization was then performed on the sixth solution containing the dissolved $Pt(NH_3)_4Cl_2 \cdot H_2O$. The crystallization was carried out under agitation in a Teflon-lined autoclave at 170° C. for 6 days. The autoclave was mounted onto a rotation holder installed in an oven. The rotation holder was rotated by a motor located outside of the oven. The rotation speed was set to about 60 rpm. The agitation from the rotation accelerated the formation of primary seeds, and, thus, accelerated the crystallization process.

The resulting solid phase was recovered by filtration, then washed with distilled water. The separation was performed using a conventional vacuum filtration process. The water aliquots were added on top of filter cake until no white precipitant was detected by the addition of a 0.1 M $AgNO_3$ solution to aliquots of the filtrate. The product was then dried at about 90-120° C. for about 16 hours.

The dried product was calcined in air at 550° C. for 8 hours, using a ramp rate of 1° C./min. to raise the temperature from the drying temperature to the calcining temperature. The Pt/NaZSM-11 wives obtained from the calcination.

After calcination, the Pt/NaZSM-11 was ion exchanged with $NH_4^+$ two times at 80-100° C. using 0.5-2.0 M of $NH_4NO_3$ (or $NH_4Cl$ aqueous solution) for 1-2 hours. The ion exchanged zeolite was calcined under the same conditions as the Pt/NaZSM-11, providing a final product of Pt/HZSM-11.

Characterization Procedures

X-Ray Analyses

The crystallinity and phase purity of the solid product was measured by powder X-ray diffraction (XRD) using a Rigaku Ultima IV multi-purpose diffractometer with a copper X-ray tube. The scanning range was set between 2° to 50° in 2θ Bragg-angles with a step size of 0.04° and the total counting time of 1° per minute. The crystallinity percentage was calculated by PANalytical High Score Plus software through the comparison of the area under the most intense diffraction peak, at 22.8° (2θ), to that of patterns of the reference zeolite. Weight percent of platinum was calculated by adding 1% of Pt to the total of $SiO_2$ and $Al_2O_3$, and measured by X-ray fluorescence (XRF).

Surface Area and Pore Volume

Surface area and pore volume were measured using a physisorption analyzer (Autosorb IQ from Quantachrome Instruments). Nitrogen adsorption at 77 K is a commonly applied technique to determine various characteristics of porous materials. The amount of adsorbed nitrogen is measured as a function of the applied vapor pressure, which comprises the adsorption isotherm.

The following characteristics are derived from the nitrogen adsorption isotherm, total pore volume calculated by total nitrogen adsorbed, and surface area. The most widely used procedure for the determination of the surface area of porous materials is the Brunauer-Emmett-Teller (BET) method. Brunauer-Emmett-Teller (BET) theory aims to explain the physical adsorption of gas molecules on a solid surface and serves as the basis for an important analysis technique for the measurement of the specific surface area of materials. In 1938, Stephen Brunauer, Paul Hugh Emmett, and Edward Teller published the first article about the BET theory in the Journal of the American Chemical Society. The BET theory applies to systems of multilayer adsorption and usually utilizes probing gases that do not chemically react with material surfaces as adsorbates to quantify specific surface area. Nitrogen is the most commonly employed gaseous adsorbate used for surface probing by BET methods.

For this reason, standard BET analysis is most often conducted at the boiling temperature of N2 (77 K). Specific surface area is a scale-dependent property, with no single true value of specific surface area definable, and thus quantities of specific surface area determined through BET theory may depend on the adsorbate molecule utilized and its adsorption cross section. The BET surface area is calculated by constructing a BET plot using the relative pressure range up to 0.3. In this part of the isotherm a single layer (or monolayer) of nitrogen molecules is formed on the surface.

Acidity and Active Metal Sites

Acidity and active metal sites were measured using a chemisorption analyzer (ChemStar from Quantachrome instruments) to perform ammonia temperature programmed desorption (NH3-TPD) and hydrogen temperature programmed reduction (H2-TPR).

To measure the catalyst acidity by NH3-TPD, a catalyst sample is loaded in a U-shape tube, which is inserted into a sample holder in a furnace.

After the sample is added in a cell and put inside the furnace of chemisorption unit, the sample is dried at 500° C. for 35 min with the flow of He gas, and thus is cooled to 50° C., after that, the gas is switched to the treatment gas, a 10% $NH_3$/He blend, which is flowed through the sample at a rate of about 30 cc/min at about 50° C. for about 35 minutes. After the treatment is completed, a postflush flow of carrier gas is passed through the catalyst sample at a flow rate of about 25 cc/min. for about two minutes. To collect data, the thermal conductivity detector is enabled. The TCD parameters include setting an automatic baseline, running at a TCD current of about 75 mA, and a TCD gain of 2. During the data collection, the signal from the TCD is recorded at a rate of about one data point every 50 seconds. The flow rate of the He carrier gas set to about 30 cc/min. A temperature ramp is used, wherein the initial temperature is set to about 50° C. and the final temperature is set to about 550° C., with a ramp rate of about 10° C. The sample is held at the maximum temperature for about 5 minutes. The desorbed $NH_3$ is analyzed by TCD detector. The TCD detector will record the $NH_3$ amount. The total acidity is measured by the area of the peaks, while the acid strength is measured by the peak locations. The peak area can be integrated by the analysis software.

To measure the metal dispersion and active sites by H2-TPR, a catalyst sample is loaded in a U-shape tube, which is inserted into a sample holder in a furnace. After the sample is added in a cell and put inside the furnace of chemisorption unit, the sample is dried at 500° C. for 35 min with the flow of He gas, and thus is cooled to 100° C. The thermal conductivity detector is enabled, using a current of about 75 mA and a gain of two. The signal sample rate is set to about 50 seconds between each data point collected. For this test, the carrier gas is blend of 5% $H_2$/Ar. A temperature ramp is used, where the initial temperature is set to about 100° C., and the final temperature is set to about 800° C., with a ramp rate of about 10° C. During the temperature increase, the $H_2$ will be consumed as metals are reduced, for example, $H_2+PtO \rightarrow Pt+H_2O$. The $H_2$ that is consumed will be recorded by the TCD detector, wherein the size of the peaks indicates how much $H_2$ consumed. The peak area can be integrated by the machine.

Results of Analyses of PtHZSM-11

The main properties of the synthesized zeolite include the Pt content, the surface area, and the pore volume. The Pt content of the PtHZSM-11 is between about 0.2 wt. % and about 1 wt. %. The surface area of the PtHZSM-11 is between about 100 and about 500 $m^2$/g. The pore volume is between about 0.05 and about 0.4 mL/g. Other properties are discussed below.

Figure 2:
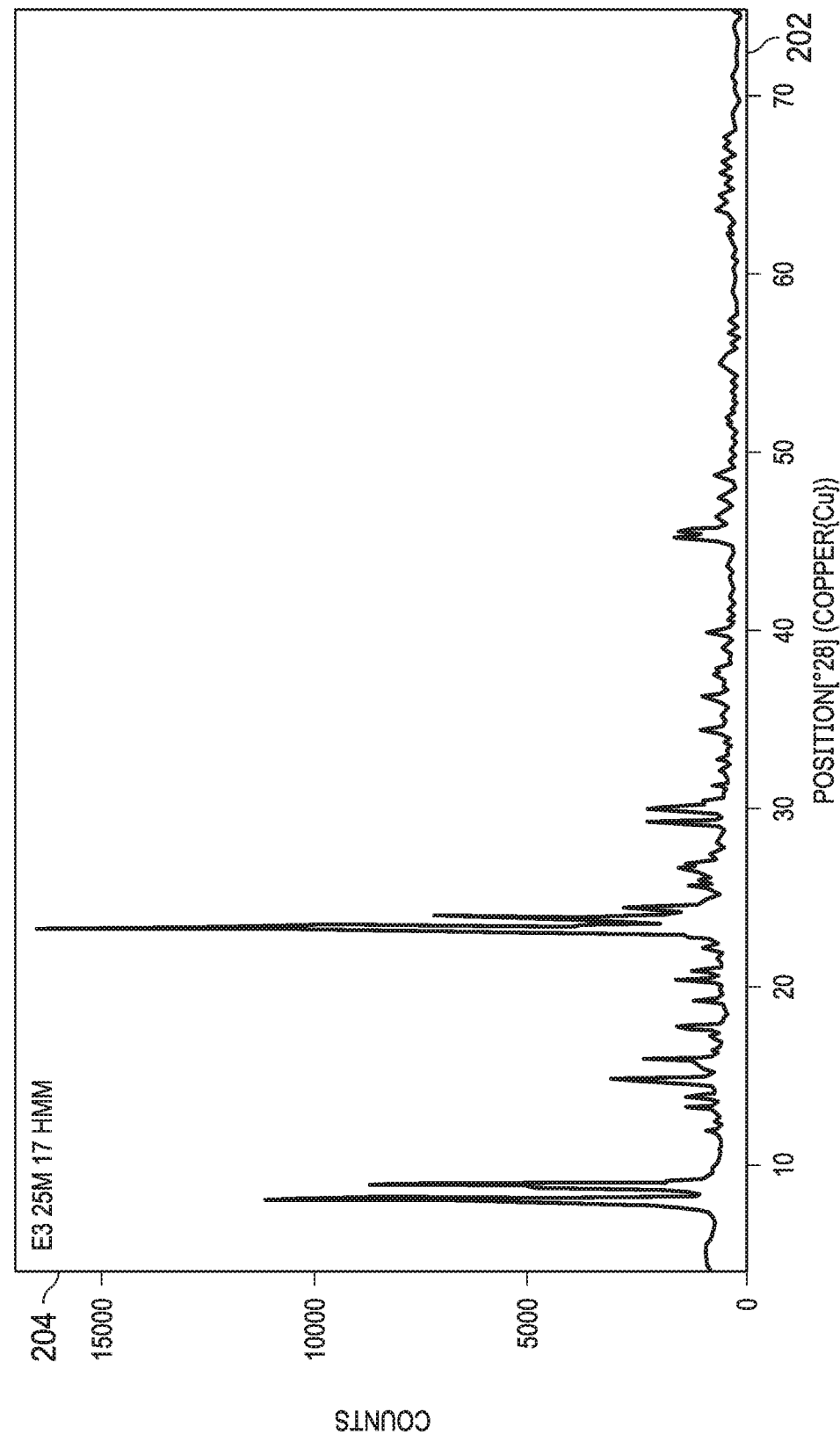
FIG. 2 is a plot of x-ray diffraction spectrum for the platinum ZSM-11 zeolite.

FIG. 2 is a plot 200 of a powder x-ray diffraction spectrum for the platinum ZSM-11 zeolite. In the plot 200, the x-axis is the position 202 of the copper x-ray tube in Bragg angles. The y-axis is the counts 204 of photons received at the detector. By comparing with standard ZMS-11 XRD profiles, the invented Pt/ZSM-11 has the same XRD profile and crystallinity with pure ZSM-11, indicating that the synthesis of the zeolite in the presence of Pt did not result in structure change.

The XRF result of the invented Pt/NaZSM-11 zeolite is summarized in Table 1. The result shows that about 1 wt. % of Pt was introduced into the zeolite. The Na content is about 0.12 wt. %, but after $NH_4^+$ ion exchange, the Na content was reduced to <0.05 wt. %.

TABLE 1

XRF results of Pt/NaZSM-11

| Elements | Concentration (wt. %) |
|---|---|
| O | 52.037 |
| Si | 43.756 |
| Al | 1.971 |
| Pt | 1.096 |
| K | 1.015 |
| Na | 0.120 |
| Zn | 0.006 |

Figure 3:
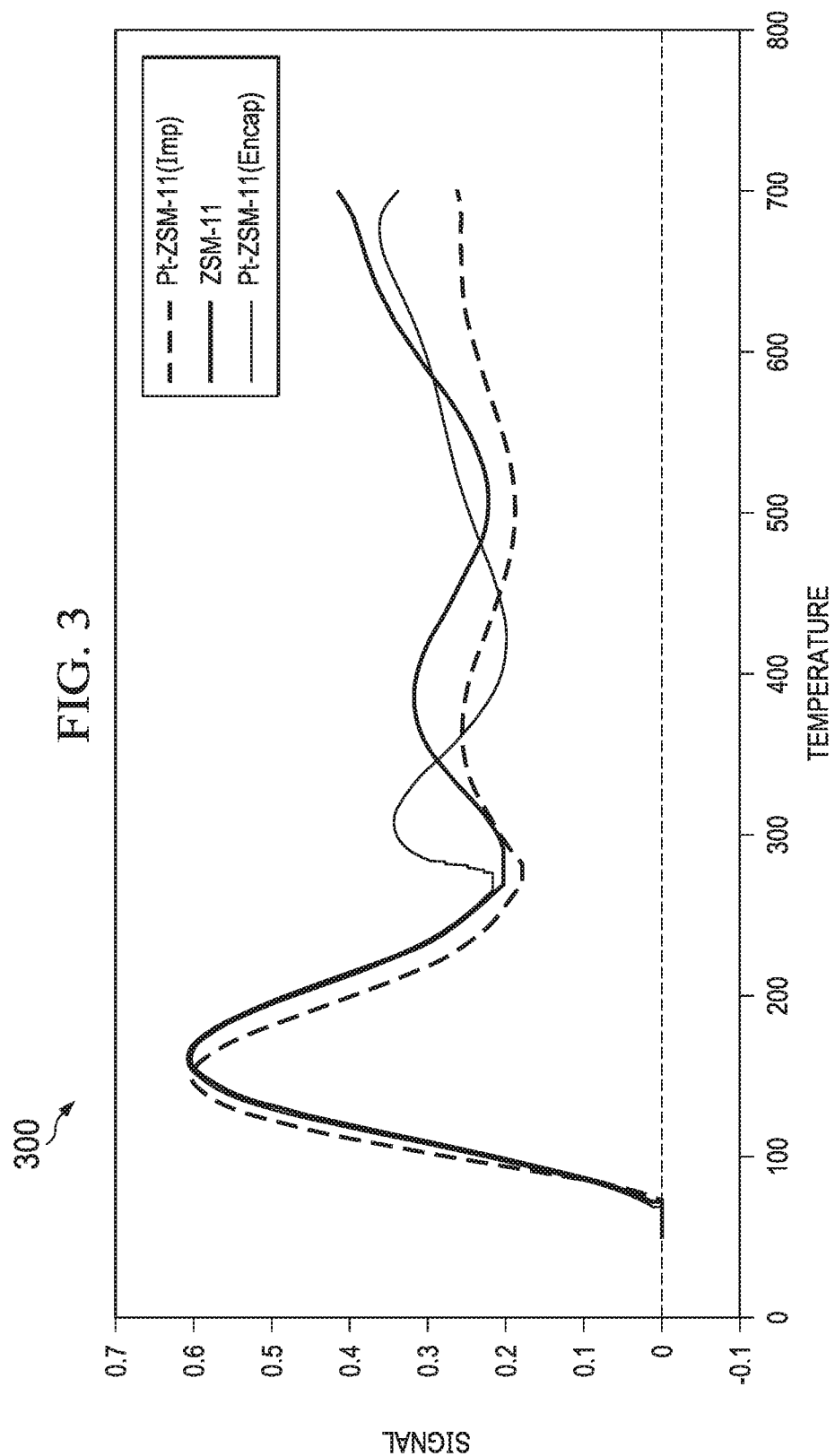
FIG. 3 is a plot comparing the NH3-TPD results for the encapsulated Pt-ZSM-11 to the impregnated Pt-ZSM-11, and the ZSM-11 with no metals.

The comparison of the total acidity was determined by running the temperature program desorption of ammonia from (NH3-TPD) on a ZSM-11 Zeolite, an impregnated Pt/ZSM-11, and an encapsulated Pt/ZSM-11. FIG. 3 is a plot 300 comparing the NH3-TPD results for the encapsulated Pt-ZSM-11 ("Encap" in the figure) to the impregnated Pt-ZSM-11 ("Imp" in the figure), and the ZSM-11 with no metals. The results are summarized in Table 2. The result shows that the encapsulated Pt/ZSM-11 has higher acidity, indicating that the aromatization activity will be higher.

TABLE 2

Acidity comparison comparisons

| Name | Total acidity (mmol/g) |
|---|---|
| ZSM-11 | 1.504 |
| Pt/ZSM-11 (Impregnated) | 1.447 |
| Pt/ZSM-11 (Encapsulated) | 1.730 |

Figure 4:
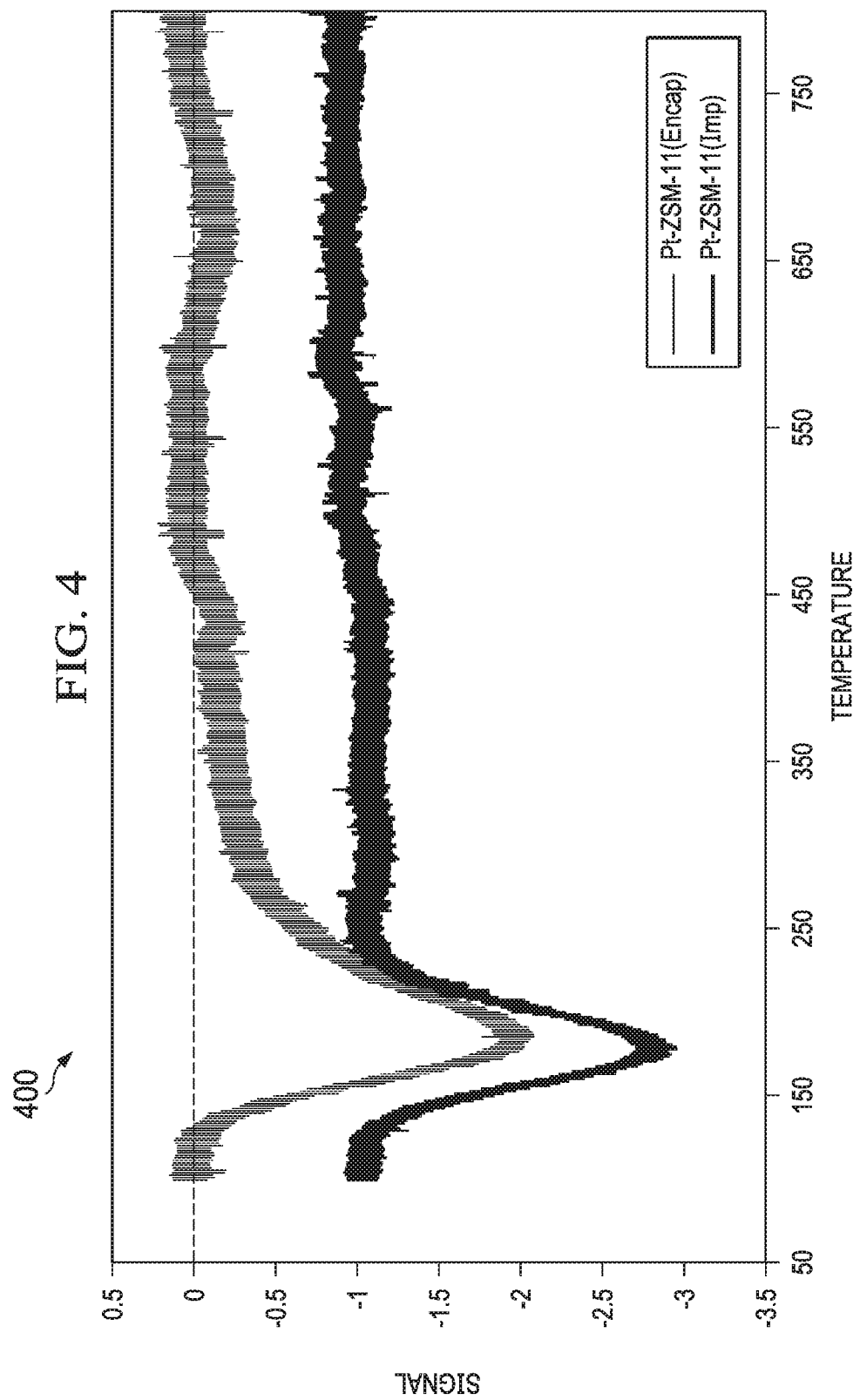
FIG. 4 is a plot comparing the H2-TPR results for the encapsulated Pt-ZSM-11 to the impregnated Pt-ZSM-11.

In order to characterize the Pt distribution, hydrogen temperature programmed reduction (H2-TPR) was performed for the Pt/ZSM-11 samples. FIG. 4 is a plot 400 comparing the H2-TPR results for the encapsulated Pt-ZSM-11 ("Encap" in the figure) to the impregnated Pt-ZSM-11 ("Imp" in the figure). The results are shown in Table 3. From the H2-TPR results, substantially more hydrogen was consumed by the encapsulated Pt/ZSM-11 then by the conventional impregnated Pt/ZSM-11. This indicates a better dispersion of the platinum on the zeolite. Accordingly this indicates that the aromatization performance will be improved.

TABLE 3

H2-TPR comparisons

| Name | Total reduction of active metal (Pt) |
|---|---|
| Pt/ZSM-11 (Impregnated) | 453.41 |
| Pt/ZSM-11 (Encapsulated) | 548.30 |

An embodiment described herein provides a method of making a zeolite with encapsulated platinum. The method includes dissolving an aluminum source in water to form a first solution, dissolving a hydroxide in water to form a second solution, dissolving a templating agent in water to form a third solution, and adding a silica source to the first solution to form a fourth solution. The method further includes adding the second solution to the fourth solution to form a fifth solution, adding the third solution to the fifth solution to form a sixth solution, and adding a platinum source to the sixth solution. The sixth solution is crystallized to form a solid product, which is recovered. The solid product is calcined. An ammonium ion exchange is performed on the solid product to form a second solid product, and the second solid product is calcined.

In an aspect, the aluminum source includes aluminum nitrate. In an aspect, the hydroxide includes sodium hydroxide. In an aspect, the templating agent includes tetrabutyl ammonium hydroxide (TBAOH). In an aspect, the silica source includes tetraethylorthosilicate (TEOS).

In an aspect, adding the silica source to the first solution is performed dropwise. In an aspect, adding the second solution to the fourth solution is performed dropwise. In an aspect, adding the third solution to the fifth solution is performed under vigorous stirring.

In an aspect, crystallizing the sixth solution includes placing the sixth solution in an autoclave, agitating the autoclave, and heating the autoclave to about 170° C. for about 6 days. In an aspect, recovering the solid product includes a vacuum filtration process to isolate the solid product from liquids from the autoclave.

In an aspect, the solid product is washed, which includes flowing water through the solid product, testing an aliquot of the filtrate with silver nitrate to determine if a precipitant forms, and flowing further aliquots of water through the solid product until no precipitant is detected by reaction with silver nitrate.

In an aspect, drying the solid product includes heating the solid product to between about 90° C. about 110° C. for about 12 hours. In an aspect, calcining the solid product includes: ramping a temperature of the solid product to about 550° C., and holding the temperature of the solid product at about 550° C. for about 8 hours. In an aspect, the temperature of the solid product is ramped to about 550° C. at about 1° C./min.

In an aspect, performing the ammonium ion exchange includes placing the solid product in an aqueous ammonia solution for about 2 hours at a temperature of between about 80° C. and about 100° C. to form a second solid product, and removing the second solid product from the aqueous ammonia solution. The second solid product is rinsed and placed in an aqueous ammonia solution for about two hours at a temperature of between about 80° C. and about 100° C. The second solid product from the aqueous ammonia solution and rinsed. In an aspect, drying the second solid product includes heating the second solid product to between about 90° C. about 110° C. for about 12 hours.

In an aspect, calcining the second solid product includes: ramping a temperature of the second solid product to about 550° C., and holding the temperature of the second solid product at about 550° C. for about 8 hours. In an aspect, the temperature of the second solid product is ramped to about 550° C. at about 1° C./min.

In an aspect, the second solid product includes PtHZSM-11. In an aspect, the PtHZSM-11 includes between about 0.2 weight percent platinum and 1 weight percent platinum. In an aspect, the PtHZSM-11 includes a surface area of between about 100 m²/g and about 500 m²/g. In an aspect, the PtHZSM-11 includes a pore volume of between about 0.05 mL/g and about 0.4 mL/g.

Other implementations are also within the scope of the following claims.

What is claimed is:

1. A method of making a ZSM-11 zeolite with encapsulated platinum, comprising:
   dissolving an aluminum source in water to form a first solution;
   dissolving a hydroxide in water to form a second solution;
   dissolving a templating agent in water to form a third solution, wherein the templating agent is tetrabutyl ammonium hydroxide (TBAOH);
   adding a silica source to the first solution to form a fourth solution;
   adding the second solution to the fourth solution to form a fifth solution;
   adding the third solution to the fifth solution to form a sixth solution;
   adding a platinum source to the sixth solution;
   crystallizing the sixth solution to form a solid product;
   recovering the solid product;
   calcining the solid product to form a platinum impregnated sodium ZSM-11 (Pt/NaZSM-11;
   performing an ammonium ion exchange on the Pt/NaZSM-11 to form Pt/NH$_4$ZSM-11; and
   calcining the Pt/NH$_4$ZSM-11 to form Pt/HZSM-11.

2. The method of claim 1, wherein the aluminum source comprises aluminum nitrate.

3. The method of claim 1, wherein the hydroxide comprises sodium hydroxide.

4. The method of claim 1, wherein the silica source comprises tetraethylorthosilicate (TEOS).

5. The method of claim 1, wherein adding the silica source to the first solution is performed dropwise.

6. The method of claim 1, wherein adding the second solution to the fourth solution is performed dropwise.

7. The method of claim 1, wherein adding the third solution to the fifth solution is performed under vigorous stirring.

8. The method of claim 1, wherein crystallizing the sixth solution comprises:
   placing the sixth solution in an autoclave;
   agitating the autoclave; and
   heating the autoclave to about 170° C. for about 6 days.

9. The method of claim 8, wherein recovering the solid product comprises a vacuum filtration process to isolate the solid product from liquids.

10. The method of claim 9, wherein the solid product is washed by:
    flowing water through the solid product to form a filtrate;
    testing an aliquot of the filtrate with silver nitrate to determine if a precipitant forms; and
    flowing further aliquots of water through the solid product until no precipitant is detected by reaction with silver nitrate.

11. The method of claim 1, comprising drying the solid product by heating the solid product to between about 90° C. about 110° C. for about 12 hours.

12. The method of claim 1, wherein calcining the solid product to form the Pt/NaZSM-11 comprises:
    ramping a temperature of the solid product to about 550° C.; and
    holding the temperature of the solid product at about 550° C. for about 8 hours.

13. The method of claim 12, wherein the temperature of the solid product is ramped to about 550° C. at about 1° C./min.

14. The method of claim 1, wherein performing the ammonium ion exchange comprises:
  placing the Pt/NaZSM-11 in an aqueous ammonia solution for about 2 hours at a temperature of between about 80° C. and about 100° C. to form Pt/NH$_4$ZSM-11;
  removing the Pt/NH$_4$ZSM-11 from the aqueous ammonia solution;
  rinsing the Pt/NH$_4$ZSM-11;
  placing the Pt/NH$_4$ZSM-11 in an aqueous ammonia solution for about two hours at a temperature of between about 80° C. and about 100° C.;
  removing the Pt/NH$_4$ZSM-11 from the aqueous ammonia solution; and
  rinsing the Pt/NH$_4$ZSM-11.

15. The method of claim 14, comprising drying the Pt/NH$_4$ZSM-11 by heating the Pt/NH$_4$ZSM-11 to between about 90° C. about 110° C. for about 12 hours.

16. The method of claim 1, wherein calcining the Pt/NH$_4$ZSM-11 to form the Pt/NaZSM-11 comprises:
  ramping a temperature of the Pt/NH$_4$ZSM-11 to about 550° C.; and
  holding the temperature of the Pt/NH$_4$ZSM-11 at about 550° C. for about 8 hours.

17. The method of claim 16, wherein the temperature of the Pt/NH$_4$ZSM-11 is ramped to about 550° C. at about 1° C./min.

18. The method of claim 1, wherein the PtHZSM-11 comprises between about 0.2 weight percent platinum and about 1 weight percent platinum.

19. The method of claim 1, wherein the PtHZSM-11 comprises a surface area of between about 100 m2/g and about 500 m2/g.

20. The method of claim 1, wherein the PtHZSM-11 comprises a pore volume of between about 0.05 mL/g and about 0.4 mL/g.

* * * * *